(12) United States Patent
Otani et al.

(10) Patent No.: US 7,116,914 B2
(45) Date of Patent: Oct. 3, 2006

(54) OPTICAL SIGNAL REGENERATOR

(75) Inventors: Tomohiro Otani, Kamifukuoka (JP); Masatoshi Suzuki, Kamifukuoka (JP)

(73) Assignee: KDDI Corporation, Tokyo (JP)

( * ) Notice: Subject to any disclaimer, the term of this patent is extended or adjusted under 35 U.S.C. 154(b) by 716 days.

(21) Appl. No.: 10/170,138

(22) Filed: Jun. 12, 2002

(65) Prior Publication Data

US 2002/0191259 A1   Dec. 19, 2002

(30) Foreign Application Priority Data

Jun. 19, 2001   (JP) .............................. 2001-184332

(51) Int. Cl.
| | |
|---|---|
| H04B 10/02 | (2006.01) |
| H04B 10/12 | (2006.01) |
| H04B 10/16 | (2006.01) |
| H04B 10/20 | (2006.01) |
| H04J 14/00 | (2006.01) |

(52) U.S. Cl. ...................... 398/175; 398/155; 375/214
(58) Field of Classification Search ................ 398/175, 398/98, 102, 154, 155; 375/214
See application file for complete search history.

(56) References Cited

U.S. PATENT DOCUMENTS

| | | | |
|---|---|---|---|
| 5,959,764 A | 9/1999 | Edagawa et al. | |
| 6,486,990 B1 * | 11/2002 | Roberts et al. | ............... 398/98 |
| 2001/0021048 A1 * | 9/2001 | Desurvire | ................... 359/124 |
| 2003/0020985 A1 * | 1/2003 | LaGasse et al. | ............ 359/135 |

* cited by examiner

Primary Examiner—Jason Chan
Assistant Examiner—Nathan Curs
(74) Attorney, Agent, or Firm—Christie, Parker & Hale, LLP

(57) ABSTRACT

The present invention regenerates optical signals in an intact optical state according to a low-speed optical clock. In one embodiment, an optical splitter applies a portion of optical pulse signals to a clock recovery circuit and the rest to an optical splitter. The optical splitter applies half of the input signal to an optical regenerator and the rest to another optical regenerator. The clock recovery circuit regenerates an electric clock signal with half the frequency of the input optical pulse and applies the clock to an optical clock pulse generator. The optical clock pulse generator generates an optical clock signal with half the frequency of the input optical pulse whose phase matches with that of the optical signal at the optical regenerator. An optical regenerator regenerates the optical signal from the optical splitter in an intact optical state. A polarization combiner combine the optical signals from the optical regenerators in mutually orthogonal polarization.

15 Claims, 6 Drawing Sheets

OPTICAL SIGNAL REGENERATOR

CROSS REFERENCE TO RELATED APPLICATIONS

This application is based upon and claims the benefit of priority from the prior Japanese Patent Application No. 2001-184332, filed Jun. 19, 2001, the entire contents of which are incorporated herein by reference.

FIELD OF THE INVENTION

This invention relates to an optical signal regenerator to regenerate optical signals in an intact optical state.

BACKGROUND OF THE INVENTION

In a conventional optical signal regenerator, especially in a conventional optical signal regenerator to regenerate high-speed optical pulse signals as fast as 40 Gbit/s in an intact optical state, an optical clock pulse train synchronizing with an input optical signal pulse train is gated by the input optical signal pulse train. Owing to this operation, even if a pulse waveform of the input optical signal is distorted, each pulse waveform of output optical signals becomes almost identical to that of the optical clock pulse train.

It is difficult to obtain a high-speed optical gate element. It is also difficult to stably generate a high-speed optical clock not only for technical aspects but also in terms of production costs. It is possible to generate a high-speed optical clock by multiplexing low-speed optical clocks in the time domain. However, a conventional optical pulse multiplexer is unable to gain sufficient pulse extinction ratios and it is yet unsatisfactory in respect of stability, quality, and costs.

Furthermore, in a high-speed optical pulse signal, to orthogonalize polarization directions of adjacent optical pulses is considered effective for suppressing interference between the adjacent pulses and also preferable for transmission characteristics. In a conventional configuration that utilizes an optical gate, it is necessary to modulate polarization of gate output light so that polarization directions of adjacent optical pulses orthogonalize at the gate output. However, it is difficult to obtain such a polarization modulating element that operates at high-speed and has such functions described above.

SUMMARY OF THE INVENTION

An optical signal regenerator, according to the present invention, comprises an optical splitter to split an input optical signal into n (an even number) portions, a clock generator to generate a clock having a 1/n frequency of a bit rate of the input optical signal out of the input optical signal, an optical clock generator to generate n optical clocks having same frequency as that of the clock from the clock generator and matching to each timing of n time slots of the input optical signal, according to the clock from the clock generator, n optical regenerators, each regenerating signal in an optical state according to both optical signal from the optical splitter and optical clock output from the optical clock generator, and an optical combiner to combine optical signals output from the n optical regenerators.

BRIEF DESCRIPTION OF THE DRAWING

The above and other objects, features and advantages of the present invention will be apparent from the following detailed description of the preferred embodiments of the invention in conjunction with the accompanying drawings, in which.

DETAILED DISCRIPTION

Embodiments of the invention are explained below in detail with reference to the drawings.

Figure 1:
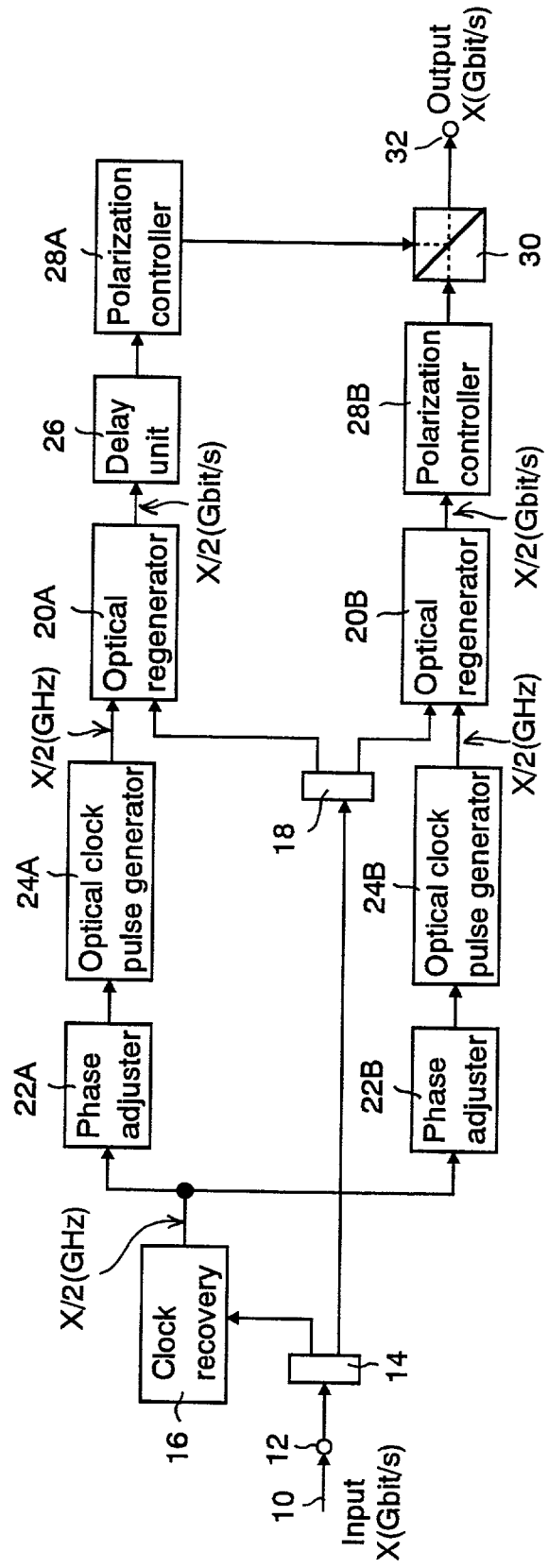
FIG. 1 shows a schematic block diagram of a first embodiment according to the invention.

FIG. 1 shows a schematic block diagram of a first embodiment according to the invention. FIGS. 2(a)–(f) respectively shows a waveform of each part.

Figure 2:
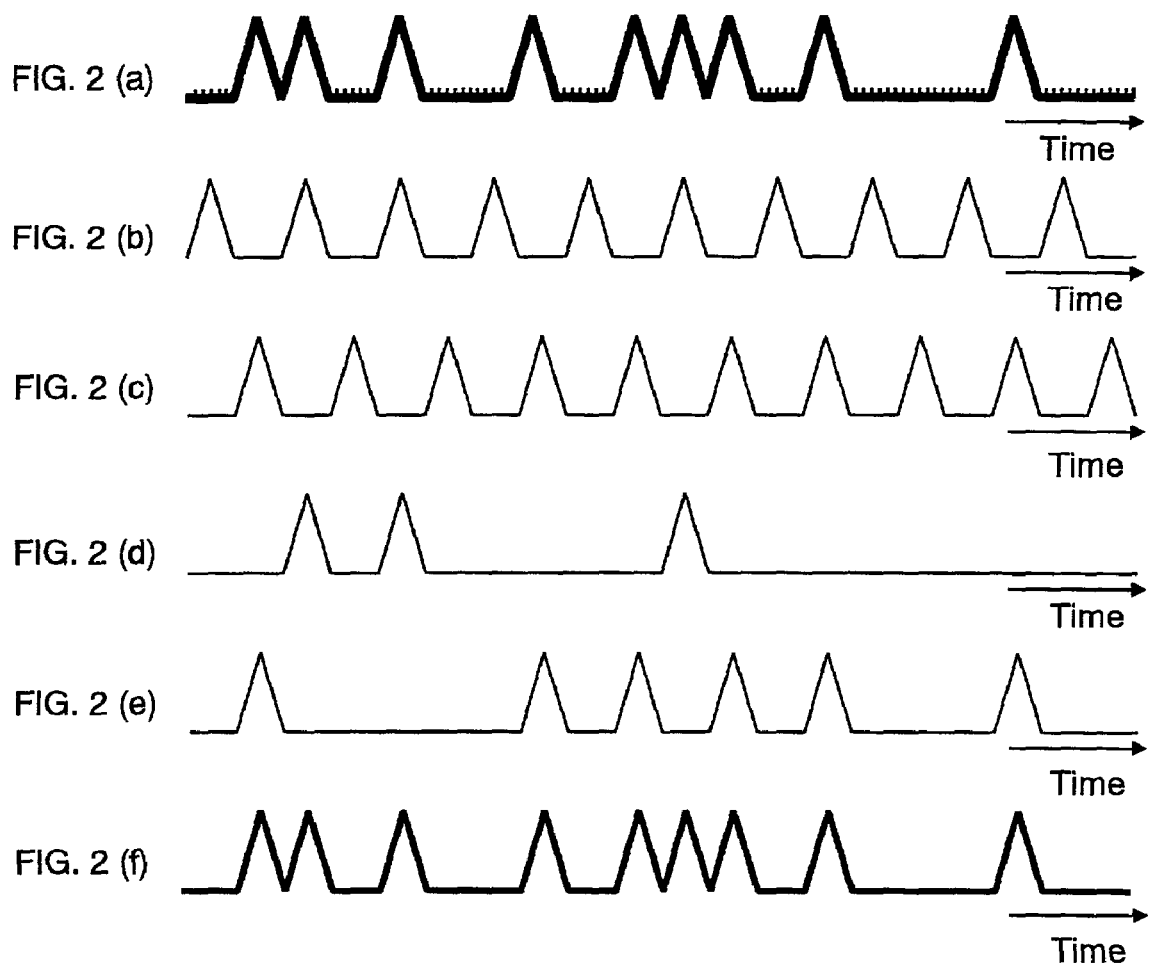
FIGS. 2(a)–2(f) show operation timetables of the embodiment shown in FIG. 1.

An optical pulse of X (Gbit/s) signal 10 enters an input terminal 12. FIG. 2(a) shows a waveform example of the optical pulse signal 10. For example, X is set to 40. An optical splitter 14 applies about 1/10 of the optical power of the optical pulse signal 10 from the input terminal 12 to a clock recovery circuit 16 and the rest to an optical splitter 18. The optical splitter 18 splits the input light into half and applies one portion to an optical regenerator 20A and the other to an optical regenerator 20B.

The clock recovery circuit 16 regenerates an electric clock signal of X/2 (GHz) out of the optical pulse from the optical splitter 14. Phase adjusters (delay circuits) 22A and 22B adjust phase of the electric clock signal from the clock recovery circuit 16 so that the phases of the outputs differ by $\pi$ from each other and the phase of the optical signal accords with that of the optical clock at each of the optical regenerators 20A and 20B. Each of optical clock pulse generators 24A and 24B synchronizes with the output from the phase adjusters 22A, 22B, generates an optical clock of X/2 (GHz), and applies the clock to the optical regenerator 20A, 20B. FIGS. 2(b) and 2(c) respectively shows an optical clock waveform output from the optical clock generator 24A, 24B.

The optical regenerators 20A, 20B are apparatuses to copy a bit pattern of the optical signal from the optical splitter 18 onto an optical clock entered separately and have both functions of optical waveform reshaping and jitter removing (retiming). FIGS. 2(d) and 2(e) respectively shows an optical signal waveform regenerated by the optical regenerator 20A, 20B.

Assuming that the input optical pulse signal of X (Gbit/s) is a signal in which two optical pulse signals of X/2 (Gbit/s) are multiplexed in the time domain, the optical regenerator 20A outputs an optical signal regenerated from one optical pulse signal of X/2 (Gbit/s) and the optical regenerator 20B outputs an optical signal regenerated from the other optical pulse signal of X/2 (Gbit/s). That is, in this embodiment, two regenerating systems to operate at half speed of the input optical pulse signal 10 are provided to separately regenerate optical signals whose bit locations shift reciprocally in the time domain. With this operation, a frequency of optical clocks needed for the optical regenerators 20A and 20B is sufficient with a half bit rate of the input optical pulse signal 10, and thus it becomes easy to stably generate the optical clocks.

To provide for combining signals, an optical delay unit 26 delays the light from the optical regenerator 20A by 1 bit period of X (Gbit/s), and a polarization controller 28A adjusts the light from the optical delay unit 26 to become a linear polarization in a predetermined polarization direction. On the other hand, a polarization controller 28B adjusts the light from the optical regenerator 20B to become a linear polarization in the predetermined polarization direction or a polarization direction orthogonal to the predetermined direction. A polarization composer (namely, a polarizing beam splitter) 30 combines the optical signals from the polarization controllers 28A and 28B in a mutually orthogonal polarization state. FIG. 2(f) shows a signal waveform output from the polarization composer 30. The light from the polarization composer 30 is output toward the outside from an output terminal 32. In the light from the polarization composer 30, a bit pattern of the input optical signal 10 is exactly reproduced, a waveform of each pulse is reshaped, and jitter is removed. Since polarizations of temporally adjacent optical pulses are mutually orthogonalized, not only the improvement of transmission characteristics are expected but also the interference between the adjacent optical pulses is prevented even if they are partly overlapped. Accordingly, it is possible to widen the optical pulse width of the optical clocks generated by the optical clock pulse generators 24A and 24B, and thus the production of the optical clock pulse generators 24A and 24B becomes much easier.

If the polarizations of the temporally adjacent optical pulses are not orthogonalized, simpler optical combiners should be disposed instead of the polarization controllers 28A, 28B and polarization composer 30.

Figure 3:
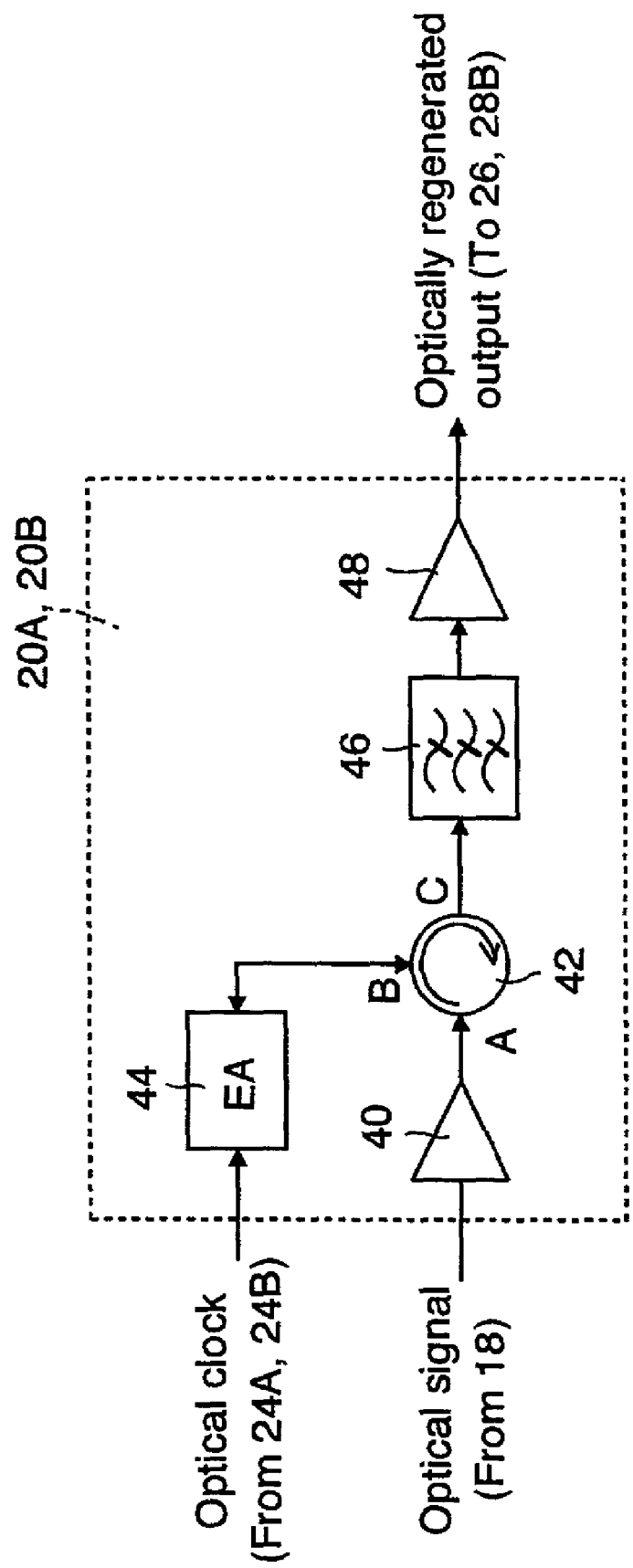
FIG. 3 shows a schematic block diagram of optical regenerators 20A and 20B.

FIG. 3 shows a schematic block diagram of the optical regenerator 20A and 20B. The optical signal from the optical splitter 18 is amplified by an optical amplifier 40 and enters an electroabsorption (EA) modulator 44 through ports A and B of an optical circulator 42. The optical clocks from the optical clock pulse generators 24A and 24B also enter the EA modulator 44 in the opposite direction to the optical signal. The EA modulator 44 functions as an optical gate to gate optical clocks according to whether or not an optical pulse exists in the optical signal. That is, the EA modulator 44 converts the optical clocks from the optical clock pulse generators 24A and 24B into optical pulse signals having the same bit pattern with that of the optical signal from the optical splitter 18. The detailed operation of the EA modulator 44 is explained in, for example, the U.S. Pat. No. 5,959,764, the entire contents of which are incorporated herein by reference.

The optical clocks gated by the EA modulator 44 are applied to the optical delay unit 26 or the polarization controller 28B through ports B and C of the optical circulators 42, an optical filter 46, and an optical amplifier 48. The optical filter 46 is disposed so as to remove unnecessary wavelength components.

Figure 4:
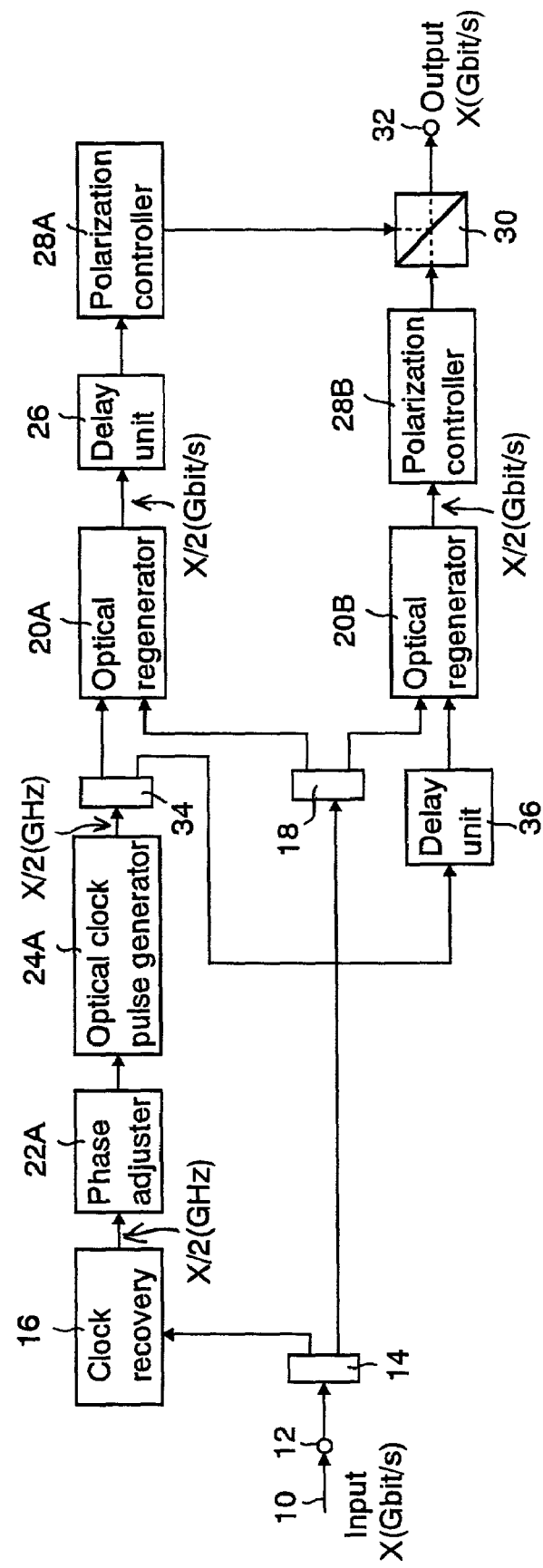
FIG. 4 shows a schematic block diagram of a second embodiment according t o the invention.

In the embodiment shown in FIG. 1, although the two optical clock pulse generators 24A and 24B are disposed, it is also applicable to divide optical clocks from only one optical clock pulse generator into two portions and to shift one portion from the other by π. FIG. 4 shows a schematic block diagram of such a modified embodiment. Identical elements are labeled with common reference numerals to those in FIG. 1.

An optical splitter 34 splits the optical clock of X/2 (GHz) from the optical clock pulse generator 24A into two portions and applies one portion to the optical regenerator 20A and the other to the optical clock recovery circuit 20B through an optical delay unit 36. The optical delay unit 36 delays the optical clock from the optical clock pulse generator 24A having timing shown in FIG. 2(b) and generates an optical clock having timing shown in FIG. 2(c). Accordingly, similarly to the embodiment shown in FIG. 1, the optical regenerators 20A and 20B regenerate the two kinds of optical pulse signals of X/2 (Gbit/s) in an optical state and the regenerated optical signals are combined in an orthogonal polarization.

One of merits in the embodiment shown in FIG. 4 is that it requires only one optical clock pulse generator 24A.

Figure 5:
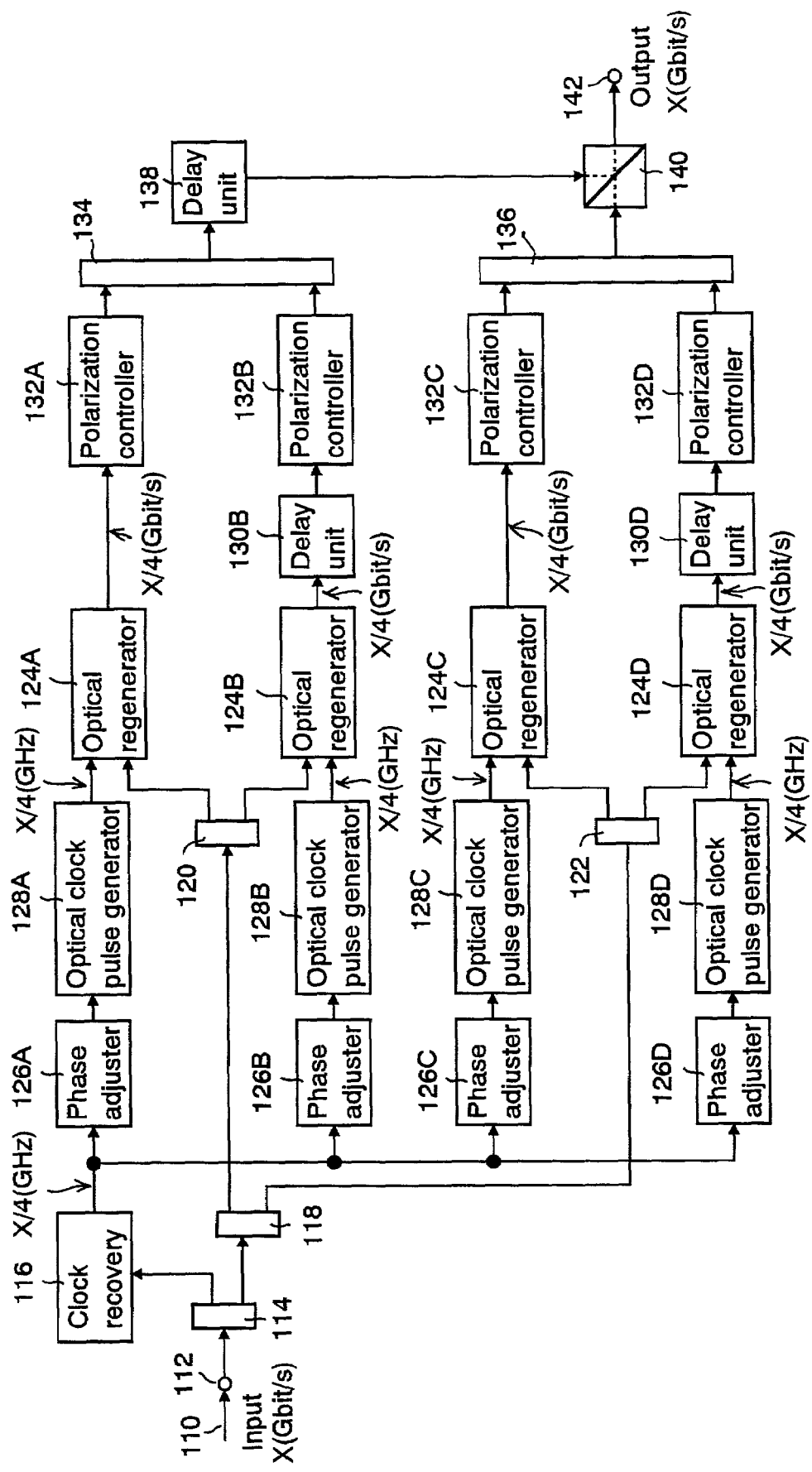
FIG. 5 shows a schematic block diagram of a third embodiment according to the invention.

When the input optical signal is divided into four portions, it is possible to regenerate the input optical signal in an optical state according to an optical clock having a quarter frequency of a bit rate of the input optical signal. FIG. 5 shows a schematic block diagram of such an embodiment.

An optical pulse signal 110 of X (Gbit/s) enters an input terminal 112. An optical splitter 114 applies about 1/10 of the power of the optical pulse signal 110 from the input terminal 112 to a clock recovery circuit 116 and the rest to an optical splitter 118. The optical splitter 118 splits the input light into two portions of the same power and applies one portion to an optical splitter 120 and the other to an optical splitter 122. The optical splitter 120 splits the input light into two portions of the same power and applies one portion to an optical regenerator 124A and the other to an optical regenerator 124B. The optical splitter 122 splits the input light into two portions of the same power and applies one portion to an optical regenerator 124C and the other to an optical regenerator 124D.

Although the details are described later, in this embodiment, the input optical pulse signal 110 is divided into four time slot units in the time domain, and the optical regenerator 124A regenerates an optical pulse signal in a first slot in an optical state, the optical regenerator 124B regenerates an optical pulse signal in a third slot, the optical regenerator 124C regenerates an optical pulse signal in a second slot, and the optical regenerator 124D regenerates an optical pulse signal in a fourth slot.

The clock recovery circuit 116 regenerates an electric clock signal of X/4 (GHz) out of the optical pulse from the optical splitter 114. The clock from the clock recovery circuit 116 is applied to optical clock pulse generators 128A, 128B, 128C, and 128D through phase adjusters 126A, 126B, 126C, and 126D. The phase adjusters (delay circuits) 126A, 126b, 126C, and 126D respectively delays the clock from the clock recovery circuit 116 so that optical clock from the optical clock pulse generators 128A, 128B, 128C, and 128D correspond to respective temporal timing of the above first time slot, third time slot, second time slot, and forth time slot. The optical clock pulse generators 128A, 128B, 128C, and 128D respectively synchronize with the clock from the phase adjusters 126A, 126b, 126C, and 126D to generate an optical clocks of X/4 (GHz) and apply them to the optical regenerators 124A, 124B, 124C, and 124D.

Each of the optical regenerators 124A, 124B, 124C, and 124D has the same configuration as that of the optical regenerator 20A and 20B, reshapes a waveforms of the input optical signal, and removes jitter. The optical regenerators 124A and 124B respectively copies a bit pattern of the optical signal from the optical splitter 120 onto the optical clocks from the optical clock pulse generators 128A and 128B, and also the optical regenerators 124C and 124D respectively copies a bit pattern of the optical signal from the optical splitter 122 onto the optical clocks from the optical clock pulse generators 128C and 128D. With those operations, as described above, the optical regenerator 124A regenerates the optical pulse signal in the first time slot of the input optical pulse signal 110, the optical regenerator 124B regenerates the optical pulse signal in third time slot, the optical regenerator 124C regenerates the optical pulse signal in the second time slot, and the optical regenerator 124D regenerates the optical pulse signal in the fourth time slot.

In this embodiment, the four optical regenerating systems that operate at a quarter speed of the input optical pulse signal 110 are provided and the optical signals in each of the four time slot units are regenerated separately. With those operations, the frequency of the optical clock needed for the optical regenerators 124A, 124B, 124C, and 124D is sufficient with a quarter of the bit rate of the input optical pulse signal, and therefore it is easily generated in a stable condition.

An optical delay unit 130B adjusts the timing of the light from the optical regenerator 124B to that of the third time slot so as to provide for combination with the regenerated optical signal in the first time slot. Polarization controllers 132A and 132B respectively controls polarizations of the light from the optical regenerator 124A and optical delay unit 130B so as to become linear polarizations in the same direction. An optical combiner 134 combines the light from the polarization controllers 132A and 132B. The optical combiner 134 functions as a time division multiplexer to multiplex the regenerated pulse signal in the first time slot and that in the third time slot of the time domain.

Similarly, the optical delay unit 130D adjusts the timing of the light from the optical regenerator 124D to that of the fourth time slot so as to provide for combination with the regenerated optical signal in the second time slot. The polarization controllers 132C and 132D respectively controls polarizations of the optical signals from the optical regenerator 124C and optical delay unit 130D so as to become linear polarizations in the same direction. An optical combiner 136 combines the optical signals from the polarization controllers 132C and 132D. The optical combiner 136 functions as a time division multiplexer to multiplex the regenerated optical pulse signal in the second time slot and that in the fourth time slot of the time domain.

An optical delay unit 138 adjusts the timing of the light from the optical combiner 134 so as to provide for combination with the light from the optical combiner 136. A polarization combiner 140 combines the optical signals (the regenerated optical signals in the first and third time slots) from the optical delay unit 138 with those (the regenerated optical signals in the second and fourth time slots) from the optical combiner 136 in mutually orthogonal polarization. The regenerated optical signal of X (Gbit/s) combined by the polarization combiner 140 is output toward the outside through an output terminal 142.

In this embodiment, similarly to the above embodiments, a waveform of the optical pulse is reshaped and jitter is removed by the optical regenerators 124A through 124D. Since polarizations of temporally adjacent optical pulses are mutually orthogonal, not only the improvement of transmission characteristics are expected but also the interference between the adjacent pulses does not occur even if they are partly overlapped. Accordingly, it is possible to widen the optical pulse width of the optical clocks generated by the optical clock pulse generators 128A through 128D, and thus the production of the optical clock pulse generators 128A through 128D becomes much easier.

Figure 6:
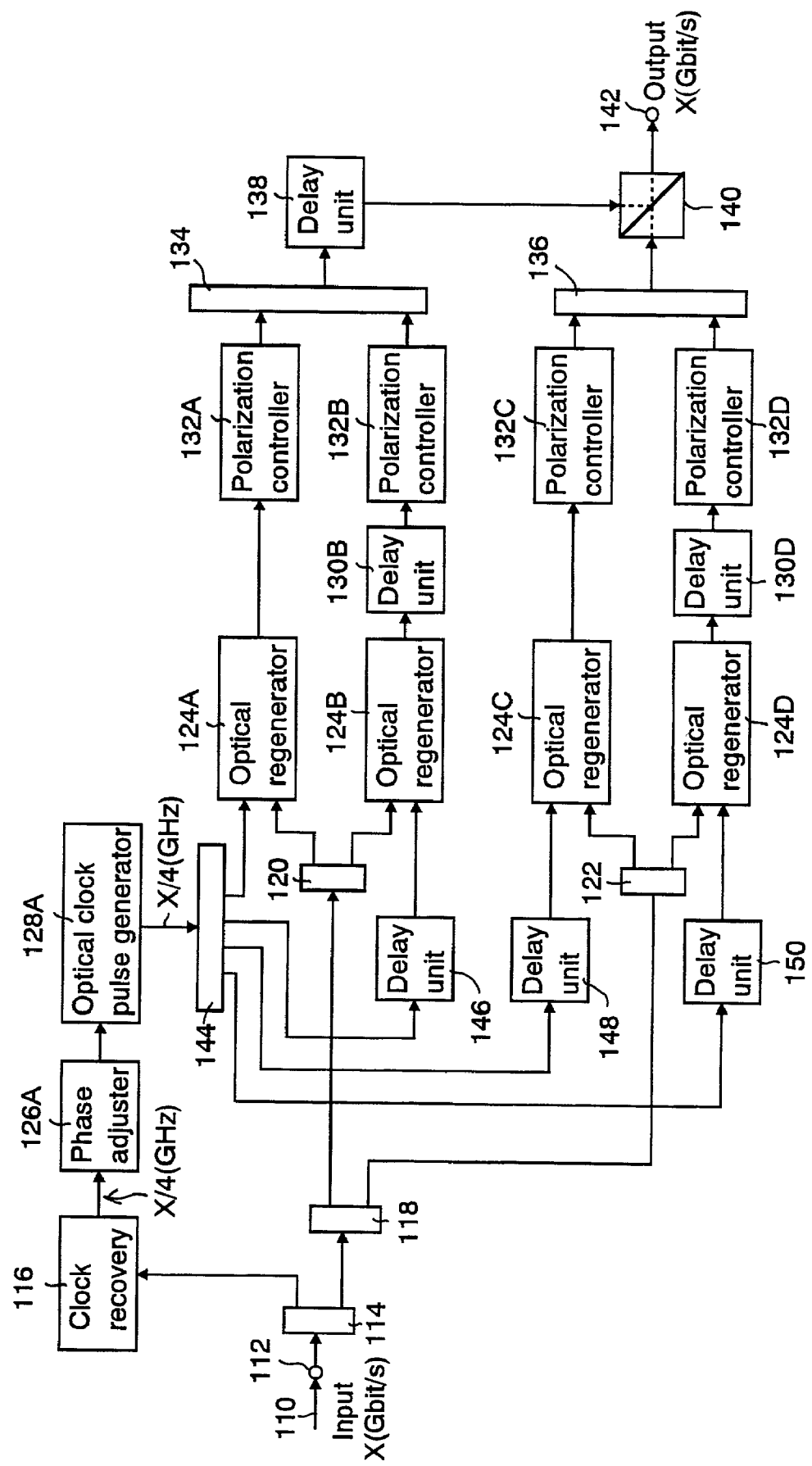
FIG. 6 shows a schematic block diagram of a fourth embodiment according to the invention.

Similarly to the modified embodiment in FIG. 4, which is the modification of the embodiment in FIG. 1, it is possible to omit the optical clock pulse generators 128A through 128D in the embodiment shown in FIG. 5. A schematic block diagram of such a modified embodiment is shown in FIG. 6. Identical elements are labeled with common reference numerals to those in FIG. 5.

An optical splitter 144 splits output light from the optical clock pulse generator 128A into four portions of the same power and applies to the optical regenerator 124A, and optical delay units 146, 148, and 150 respectively. The optical delay units 146, 148, and 150 respectively adjusts timing of the optical clock from the optical splitter 144 so as to match with that of the optical signal entered the optical regenerators 124B, 124C, and 124D and apply them to the optical regenerators 124B, 124C, and 124D.

The rest of the operation is omitted because it is same to that of the embodiment shown in FIG. 5.

As readily understandable from the aforementioned explanation, according to the invention, it is possible to regenerate a high-speed optical signal in an intact optical state using low-speed optical clocks and to output it at an original speed. By orthogonally multiplexing the regenerated optical signals, polarizations between adjacent pulses become orthogonal.

While the invention has been described with reference to the specific embodiment, it will be apparent to those skilled in the art that various changes and modifications can be made to the specific embodiment without departing from the spirit and scope of the invention as defined in the claims.

The invention claimed is:

1. An optical signal regenerator comprising:
   an optical splitter to split an input optical signal into n portions, wherein n is an even number;
   an electric clock generator to generate an electric clock having a 1/n frequency of a bit rate of the input optical signal;
   an optical clock generator to generate n optical clocks having a 1/n frequency of the input optical signal and matching to each timing of n time slots of the input optical signal according to the electric clock from the electric clock generator;
   n optical regenerators, each regenerating an optical signal in an intact optical state according to the optical signal from the optical splitter and the optical clock from the optical clock generator; and
   an optical combiner to combine the optical signals from the n optical regenerators.

2. The optical signal regenerator of claim 1 wherein the optical combiner comprises n polarization controllers to control polarization of each optical signals from the n optical regenerators and a polarization combiner to combine the optical signals from the n polarization controllers so that adjacent time slots form an orthogonal polarization.

3. The optical signal regenerator of claim 1 wherein the optical clock generator comprises n phase adjusters, each adjusting phase of the electric clock from the electric clock generator into a predetermined time slot within the n time slots of the input optical signal and n optical clock pulse generators to respectively generate optical clocks having same frequencies, according to the electric signals from the n phase adjusters.

4. The optical signal regenerator of claim 1 wherein the optical clock generator comprises an optical clock pulse generator to generate an optical clock according to the electric clock from the electric clock generator, an optical clock splitter to split the optical clock from the optical clock pulse generator into n portions, and (n-1) optical delay units to control timing of each of the optical clocks from the optical clock splitter to correspond to a predetermined time slot within the n time slots of the input optical signal.

5. The optical signal regenerator of claim 1 wherein n is two.

6. The optical signal regenerator of claim 1 wherein n is four.

7. An optical signal regenerator comprising:
   an optical splitter to split an input optical signal into n portions, wherein n a is an even number;
   an optical clock generator to generate n optical clocks each having a 1/n frequency of the input optical signal and synchronized to the input optical signal;
   n optical regenerators, each regenerating an optical signal based on one of the optical signal portions from the optical splitter and one of the optical clocks from the optical clock generator; and
   an optical combiner to combine n optical signals from the a optical regenerators.

8. The optical signal regenerator of claim 7 wherein the optical combiner comprises n polarization controllers to control polarization of each optical signal from the a optical regenerators and a polarization combiner to combine the optical signals from the n polarization controllers so that adjacent time slots of the input optical signal form an orthogonal polarization.

9. The optical signal regenerator of claim 7 further comprising a clock generator to generate an electric clock having a 1/n frequency of the input optical signal, wherein the optical clock generator comprises n phase adjusters, each adjusting phase of the electric clock from the clock generator into a predetermined time slot within n time slots of the input optical signal and n optical clock pulse generators to respectively generate optical electric clocks having same frequencies as the optical signals from the n phase adjusters.

10. The optical signal regenerator of claim 7 further comprising a clock generator to generate an electric clock having a 1/n frequency of the input optical signal, wherein the optical clock generator comprises an optical clock pulse generator to generate an optical clock based on the electric clock from the clock generator; an optical clock splitter to split the optical clock from the optical clock pulse generator into n portions; and n-1 optical delay units to control sash timing of each of the n-1 optical clocks from the optical clock splitter to correspond to a predetermined time slot within n time slots of the input optical signal.

11. The optical signal regenerator of claim 7 wherein n is two.

12. The optical signal regenerator of claim 7 wherein n is four.

13. A method for regenerating an optical signal comprising:
   splitting an input optical signal into a portions, wherein n is a even number;
   generating an electric clock having a 1/n frequency of the input optical signal;
   generating n optical clocks having a 1/n frequency of the input optical signal and synchronized with the input optical signal;
   regenerating n optical signals based on the n split portions of the optical input signal and the n optical clocks; and
   combining the n regenerated optical signals together.

14. The method of claim 13 wherein n is two.

15. The method of claim 13 wherein n is four.

* * * * *